(12) United States Patent
Buttimer et al.

(10) Patent No.: US 10,173,612 B2
(45) Date of Patent: Jan. 8, 2019

(54) WIRING ATTACHMENT ASSEMBLY AND WIRING SYSTEM FOR A MOTOR VEHICLE

(71) Applicant: FORD GLOBAL TECHNOLOGIES, LLC, Dearborn, MI (US)

(72) Inventors: Vincent John Buttimer, Detroit, MI (US); Bryn Arthur Davies, Novi, MI (US); Keith Alan Brown, Riverview, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/290,514

(22) Filed: Oct. 11, 2016

(65) Prior Publication Data
US 2018/0099628 A1   Apr. 12, 2018

(51) Int. Cl.
| | |
|---|---|
| *B60R 16/02* | (2006.01) |
| *H02G 3/30* | (2006.01) |
| *H02G 3/06* | (2006.01) |
| *H02G 3/04* | (2006.01) |
| *B60N 2/02* | (2006.01) |
| *H02G 3/32* | (2006.01) |
| *H02G 3/34* | (2006.01) |

(52) U.S. Cl.
CPC ............ *B60R 16/0215* (2013.01); *B60N 2/02* (2013.01); *H02G 3/0437* (2013.01); *H02G 3/06* (2013.01); *H02G 3/24* (2013.01); *H02G 3/32* (2013.01); *H02G 3/34* (2013.01)

(58) Field of Classification Search
CPC .... B60R 16/0215; H02G 3/0437; H02G 3/06; H02G 3/24
USPC ....................................... 174/72 A
See application file for complete search history.

(56) References Cited

U.S. PATENT DOCUMENTS

| | | | |
|---|---|---|---|
| 2,581,288 A * | 1/1952 | Pletcher, Jr. ............ | F16B 21/16 411/520 |
| 2,931,851 A | 4/1960 | Sims et al. | |
| 3,147,523 A | 9/1964 | Logan et al. | |
| 3,443,472 A * | 5/1969 | Cissell ................ | F16B 19/1081 24/704.1 |
| 5,803,692 A * | 9/1998 | Postadan ................. | F16B 21/20 411/520 |
| 5,871,320 A * | 2/1999 | Kovac ................. | F16B 37/0842 411/182 |
| 5,929,382 A | 7/1999 | Moore et al. | |
| 6,299,106 B1 | 10/2001 | Shorey | |
| | (Continued) | | |

FOREIGN PATENT DOCUMENTS

| | | |
|---|---|---|
| CA | 1313444 C | 2/1993 |
| WO | 2012153168 A1 | 11/2012 |

OTHER PUBLICATIONS

"BMW E90/E92 OEM Alarm Installation"; e90post.com; http://billswebspace.com/e900EMAlarmInstallation.htm; pp. 1-16.

*Primary Examiner* — Timothy Thompson
*Assistant Examiner* — Charles Pizzuto
(74) *Attorney, Agent, or Firm* — Vichit Chea; King & Schickli, PLLC

(57) ABSTRACT

A wiring attachment assembly includes a stud having at least one channel, a gripping washer engaging the stud in the at least one channel and a wiring conduit including a receiver engaging and holding the stud. A wiring system, incorporating the wiring attachment assembly and an insulator element, as well as a method of wiring for a power folding seat are also disclosed.

18 Claims, 4 Drawing Sheets

(56) References Cited

U.S. PATENT DOCUMENTS

| | | |
|---|---|---|
| 7,976,095 B2 | 7/2011 | Guanzon et al. |
| 9,126,549 B2 | 9/2015 | Shimanaka |
| 2002/0176764 A1* | 11/2002 | Cobzaru ................. F16B 19/05 411/361 |
| 2007/0241241 A1* | 10/2007 | Peterson ................. F16L 3/127 248/65 |
| 2008/0083719 A1 | 4/2008 | Bartucco |
| 2008/0315030 A1* | 12/2008 | Hendrickson ........ B65H 49/327 242/565 |
| 2009/0226663 A1 | 9/2009 | Hutter, III |
| 2015/0300396 A1 | 10/2015 | Balderrama et al. |

* cited by examiner

WIRING ATTACHMENT ASSEMBLY AND WIRING SYSTEM FOR A MOTOR VEHICLE

TECHNICAL FIELD

This document relates generally to the motor vehicle equipment field and, more particularly, to a wiring attachment assembly as well as to a wiring system comprising an insulator element and the wiring attachment assembly. Such a wiring system may be utilized in a method of wiring a power folding seat or for other purposes.

BACKGROUND

Motor vehicle design and space constraints may conspire to create packaging problems related to the placement of system control modules and the routing of wiring for those modules.

This document relates to a new and improved wiring attachment assembly specially adapted to address these issues. In addition, this document relates to a related wiring system for a motor vehicle that comprises an insulator element such as an interior insulator in combination with the wiring attachment assembly. Still further, this document also relates to a method of wiring for a power folding seat.

SUMMARY

In accordance with the purposes and benefits described herein, a wiring attachment assembly is provided. That wiring attachment assembly comprises a stud including at least one channel, a gripping washer engaging that stud in the at least one channel and a wiring conduit including a receiver engaging and holding the stud.

The gripping washer may include a body having a central opening. That body may include a plurality of resilient tabs defining the central opening. Where the stud has a first effective diameter $D_1$, the central opening may have a second effective diameter $D_2$ where $D_1 > D_2$. In some embodiments of the wiring attachment assembly, the gripping washer may be a Tinnerman washer.

In accordance with an additional aspect, a wiring system is provided for a motor vehicle. That wiring system comprises an insulator element and a wiring attachment assembly. That wiring attachment assembly includes a stud, a gripping washer engaging the stud and a wiring conduit including a receiver engaging the stud.

The stud may include a head and at least one channel. The gripping washer may include a body having a central opening. The body may include a plurality of resilient tabs defining the central opening. Further, where the stud has a first effective diameter $D_1$, the central opening may have a second effective diameter $D_2$ where $D_1 > D_2$.

The stud may extend through the insulator element and a portion of the insulator element may be captured between the head and the gripping washer. The insulator element may be, but is not necessarily limited to, an interior insulator such as a wheel house insulator. That wheel house insulator may include a power folding seat module engagement point. Further, the wiring system may include a power folding seat module mounted at the power folding seat module engagement point of the wheel house insulator.

Consistent with yet another aspect, a method is provided of wiring for a power folding seat. That method comprises the steps of mounting a power folding seat module to a wheel house insulator and routing wiring for the power folding seat module through a wiring attachment assembly connected to the wheel house insulator.

More specifically, that method may include securing a stud through an aperture in the wheel house insulator by means of a gripping washer. Further, the method may include securing a wiring conduit to the stud. Still further, the method may also include passing the wiring through the wiring conduit.

In the following description, there are shown and described several preferred embodiments of the wiring attachment assembly and the related wiring system and method. As it should be realized, the wiring attachment assembly, the wiring system and the method are all capable of other, different embodiments and their several details are capable of modification in various, obvious aspects all without departing from the wiring attachment assembly, wiring system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the wiring attachment assembly, the wiring system and the method and together with the description serve to explain certain principles thereof.

Reference will now be made in detail to the present preferred embodiments of the wiring attachment assembly and wiring system, examples of which are illustrated in the accompanying drawing figures.

DETAILED DESCRIPTION

Figure 1:
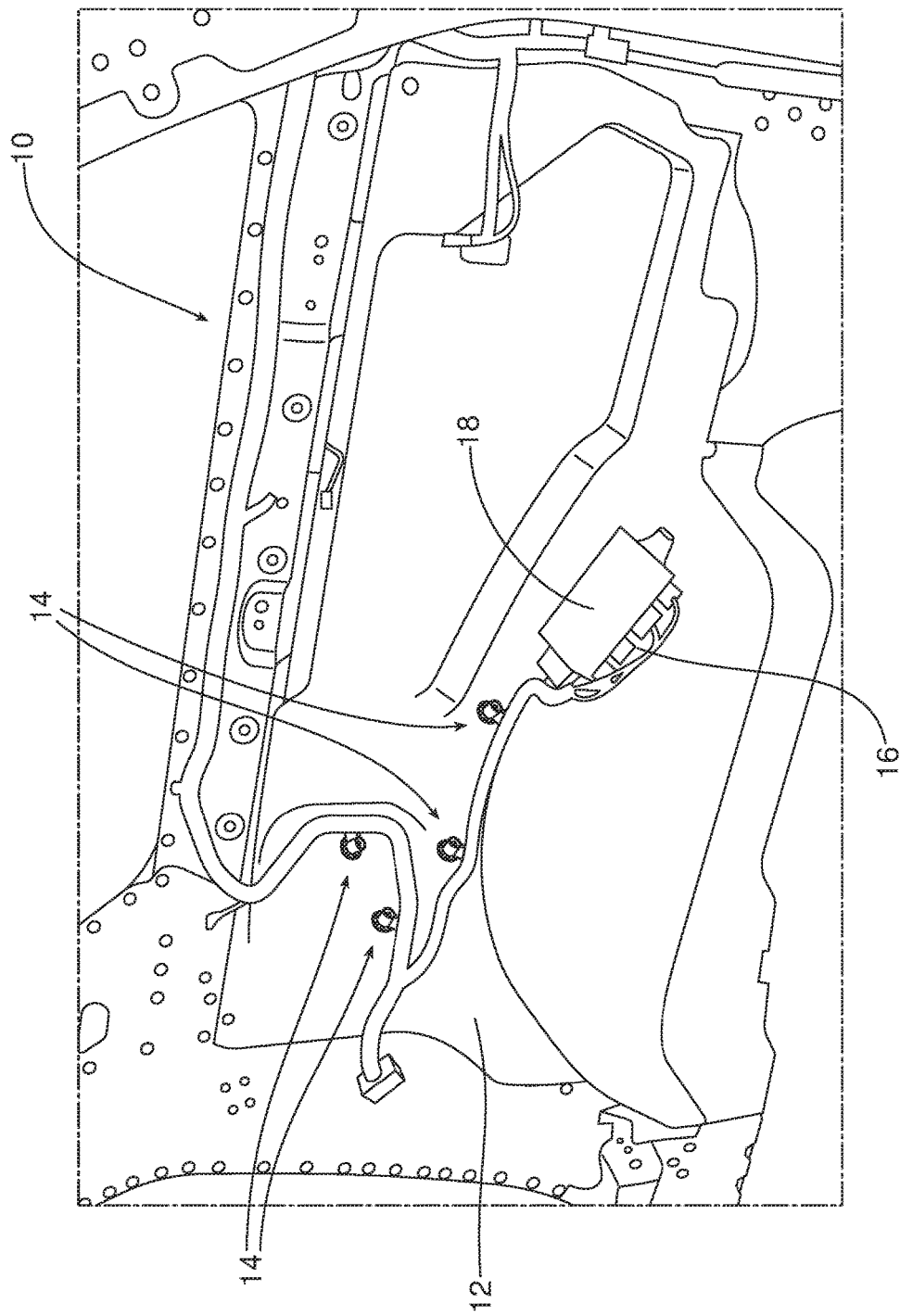
FIG. 1 is a perspective view of a wiring system for a motor vehicle wherein that wiring system includes an insulator element and a wiring attachment assembly.

Reference is now made to FIG. 1 illustrating a wiring system 10 for a motor vehicle including insulator element 12 and a wiring attachment assembly 14. In the illustrated embodiment the insulator element 12 is an interior insulator and, more specifically, a wheel house insulator.

The insulator element 12 includes a power folding seat module engagement point 16. A power folding seat module 18 is mounted at the power folding seat module engagement point 16 by means of appropriate fasteners of a type known in the art (not shown).

Figure 2:
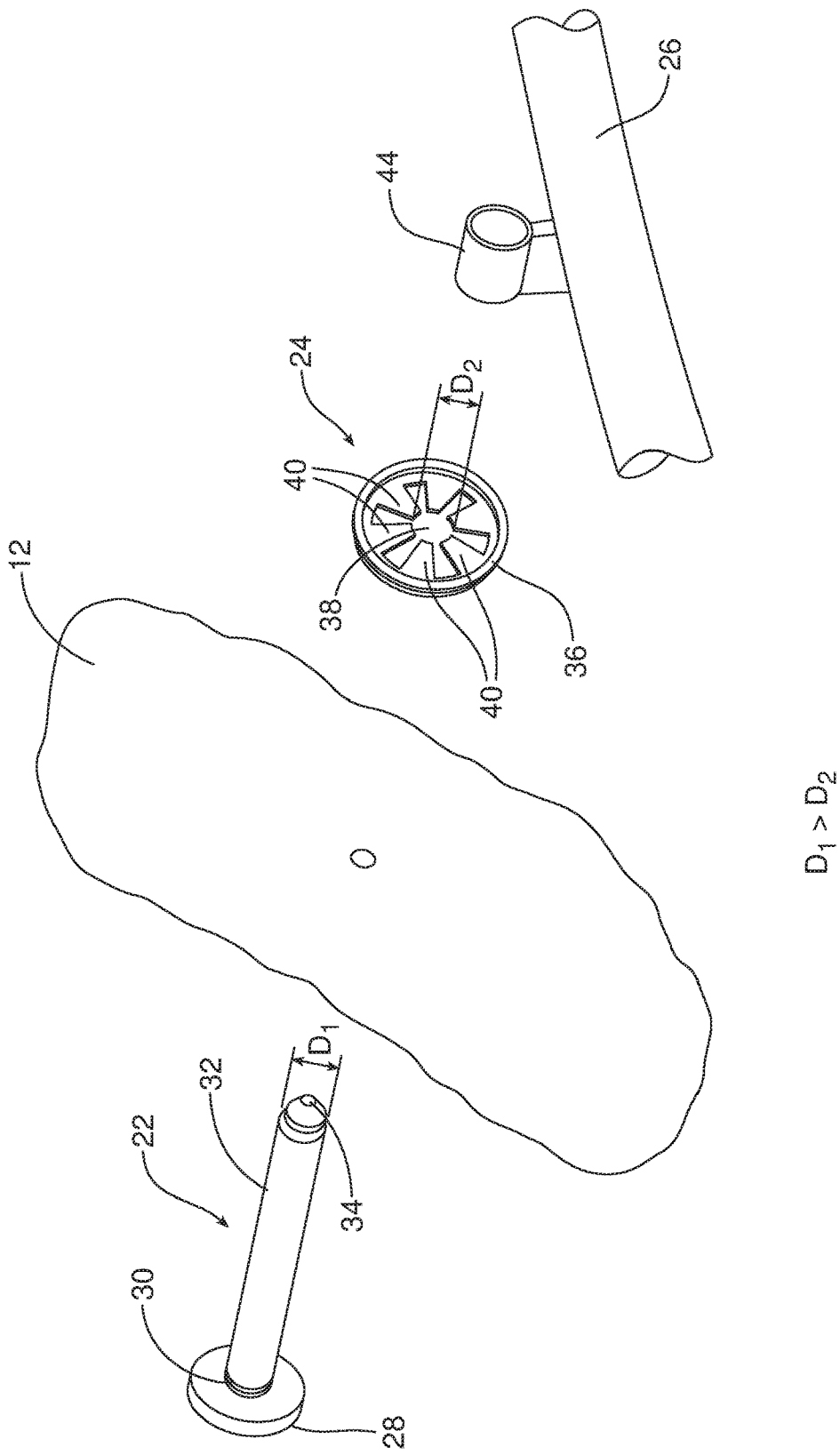
FIG. 2 is an exploded perspective view of the wiring attachment assembly shown in FIG. 1.
Figure 3:
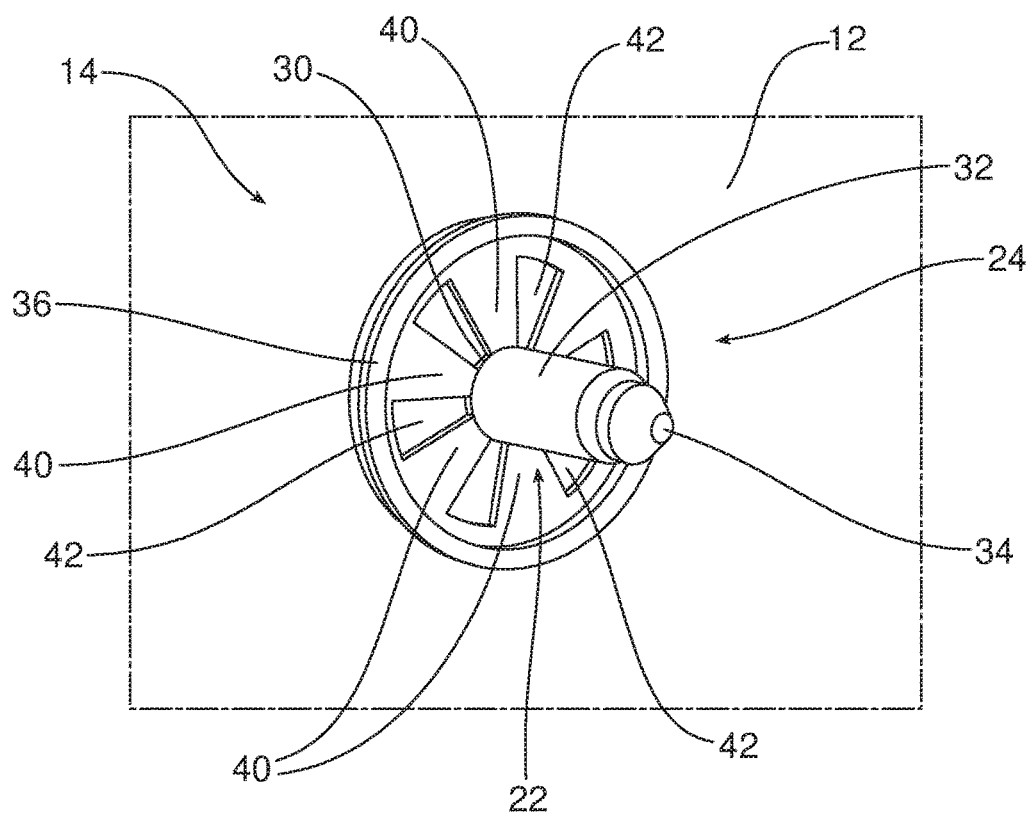
FIG. 3 is a detailed perspective view illustrating the stud and gripping washer of the wiring attachment assembly that forms a part of the wiring system illustrated in FIG. 1.
Figure 4:
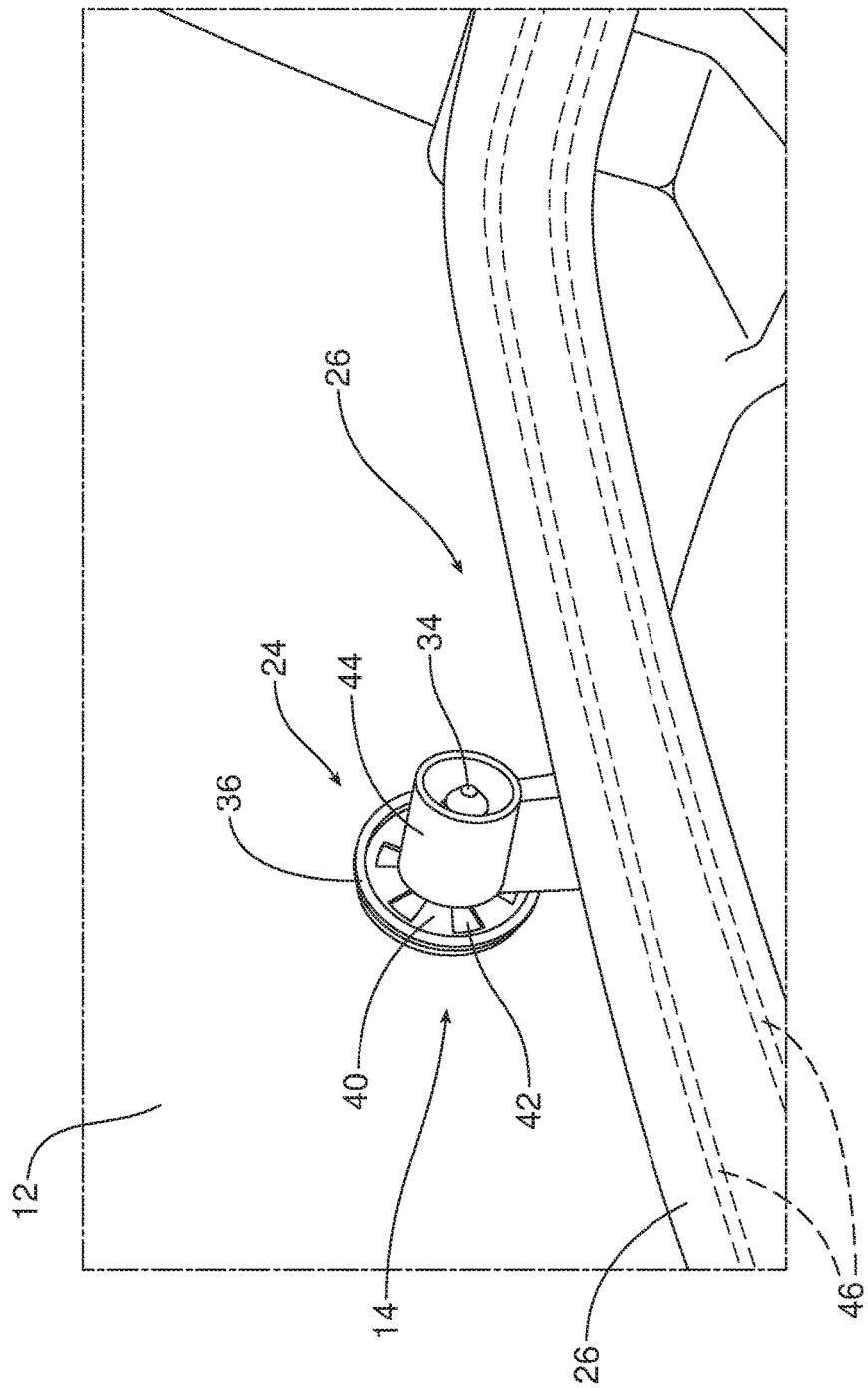
FIG. 4 is a detailed perspective view illustrating a wiring conduit connected to the stud illustrated in FIG. 3.

The wiring attachment assembly 14 of the wiring system 10 is illustrated in detail in FIGS. 2-4. The wiring attachment assembly 14 includes a stud 22, a gripping washer 24 and a wiring conduit 26.

More specifically, the stud 22 includes a head 28 and at least one channel 30 formed in the shaft 32 of the stud. The shaft 32 may include a pointed or rounded end 34 opposite the head 28.

The gripping washer 24 includes a body 36 having a central opening 38. More specifically, the body 36 includes an inner margin comprising a plurality of resilient tabs 40 that define the central opening 38. In the illustrated embodiment, the shaft 32 of the stud 22 has a first effective diameter $D_1$ while the central opening 38 has a second effective diameter $D_2$ where $D_1 > D_2$.

The stud 22 extends through the insulator element 12 and a portion 42 of the insulator element is captured between the head 28 and the gripping washer 24. More specifically, the stud 22 is inserted through the insulator element 12 and the gripping washer 24 is then pressed onto the end of the stud 22 until the resilient tabs 40 defining the central opening 38 are received and engaged in the channel 30 of the stud 22. See particularly FIGS. 2 and 3. The wiring conduit 26 includes a receiver 44 that may be pressed over the free end 34 of the stud 22 so as to resiliently engage for a friction fit or otherwise connect to the stud and thereby secure the wiring conduit 26 in position against the insulator element 12.

Consistent with the above description, a method is provided for wiring a power folding seat. That method comprises mounting the power folding seat module 18 to the wheel house insulator/insulator element 12 and routing wiring 46 for the power folding seat module through a wiring attachment assembly 14 connected to the insulator element. More specifically, the wiring 46 is routed through the wiring conduit 26 of the wiring attachment assembly 14 as illustrated in FIG. 1.

Further, the method may include the step of securing the stud 22 through the insulator element 12 by means of the gripping washer 24 as described above and illustrated in FIGS. 2 and 3.

Still further, the method may include the step of securing the wiring conduit 26 to the stud 22 by snapping or otherwise attaching the receiver 44 over the free end 34 of the stud shaft 32 as illustrated in FIGS. 2 and 3. Still further, the method may also include the step of passing the wiring 46 through the wiring conduit 26.

The wiring system 10 and the wiring attachment assembly 14 represent simple and cost effective devices for addressing and resolving many different wiring applications with difficult packaging requirements. In the illustrated embodiment, the insulator element 12 is a wheel house insulator and the wiring 46 is for a power folding seat module 18. It should be appreciated that the illustrated embodiment is simply exemplary in nature and that the wiring system 10, the wiring attachment assembly 14 and the related method are not to be considered as limited thereto. Thus, the wiring system 10 may include insulator elements other than a wheel house insulator and wiring may be provided for modules other than a power folding seat module 18.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A wiring attachment assembly, comprising:
   a stud including a head and at least one channel adjacent to the head at a first end;
   a gripping washer engaging and holding said stud in said at least one channel; and
   a wiring conduit including a receiver adapted to engage and hold said stud at a second end.

2. The wiring attachment assembly of claim 1, wherein said gripping washer includes a body having a central opening.

3. The wiring attachment assembly of claim 2, wherein said body includes a plurality of resilient tabs defining said central opening.

4. The wiring attachment assembly of claim 3, wherein said stud has a first effective diameter $D_1$ and said central opening has a second effective diameter $D_2$ where $D_1 > D_2$.

5. The wiring attachment assembly of claim 4, wherein said gripping washer is a Tinnerman-type washer.

6. A wiring system for a motor vehicle, comprising:
   an insulator element; and
   a wiring attachment assembly including a stud including a head and at least one channel adjacent to the head at a first end, a gripping washer engaging and holding said stud in said at least one channel, and a wiring conduit including a receiver adapted to engage and hold said stud at a second end.

7. The wiring system of claim 6, wherein said gripping washer includes a body having a central opening.

8. The wiring system of claim 7, wherein said body includes a plurality of resilient tabs defining said central opening.

9. The wiring system of claim 8, wherein said stud has a first effective diameter $D_1$ and said central opening has a second effective diameter $D_2$ where $D_1 > D_2$.

10. The wiring system of claim 9, wherein said stud extends through said insulator element and a portion of said insulator element is captured between said head and said gripping washer.

11. The wiring system of claim 10, wherein said insulator element is a wheel house insulator.

12. The wiring system of claim 11, wherein said wheel house insulator includes a power folding seat module engagement point.

13. The wiring system of claim 12, further including a power folding seat module mounted at said power folding seat module engagement point.

14. A method of wiring for a power folding seat, comprising:
   mounting a power folding seat module to a wheel house insulator; and
   routing wiring for said power folding seat module through a wiring attachment assembly connected to said wheel house insulator;
   further including providing the wiring attachment assembly comprising a stud including a head and at least one channel adjacent to the head at a first end, a gripping washer engaging and holding said stud in said at least one channel, and a wiring conduit including a receiver adapted to engage and hold said stud at a second end.

15. The method of claim 14, further including securing said stud through said wheel house insulator by use of said gripping washer.

16. The method of claim 15, further including securing said wiring conduit to said stud by said receiver.

17. The method of claim 16, further including passing said wiring through said wiring conduit.

18. The wiring attachment assembly of claim 1, wherein the receiver engages and holds said stud in a friction fit.

* * * * *